US008934013B2

(12) United States Patent
Smith (10) Patent No.: US 8,934,013 B2
(45) Date of Patent: Jan. 13, 2015

(54) VIDEO CAMERA AND EVENT DETECTION SYSTEM

(75) Inventor: Brian David Vincent Smith, Worthing (GB)

(73) Assignee: 3M Innovative Properties Company, St. Paul, MN (US)

(*) Notice: Subject to any disclaimer, the term of this patent is extended or adjusted under 35 U.S.C. 154(b) by 828 days.

(21) Appl. No.: 12/990,571

(22) PCT Filed: May 1, 2009

(86) PCT No.: PCT/GB2009/001110
§ 371 (c)(1),
(2), (4) Date: Dec. 8, 2010

(87) PCT Pub. No.: WO2009/133377
PCT Pub. Date: Nov. 5, 2009

(65) Prior Publication Data
US 2011/0090377 A1  Apr. 21, 2011

(30) Foreign Application Priority Data

May 1, 2008 (GB) .................................. 0807981.6

(51) Int. Cl.
*H04N 5/225* (2006.01)
*H04N 7/18* (2006.01)
*G06K 9/20* (2006.01)
(Continued)

(52) U.S. Cl.
CPC .............. *H04N 7/188* (2013.01); *G06K 9/2054* (2013.01); *G06K 9/3258* (2013.01); *G08B 13/19615* (2013.01); *G08B 13/19663* (2013.01)
USPC ............................ 348/143; 348/152; 348/155

(58) Field of Classification Search
USPC ........... 348/135–160, 208.3, 208.14; 382/103
See application file for complete search history.

(56) References Cited

U.S. PATENT DOCUMENTS 7,423,669 B2* 9/2008 Oya et al. ................. 348/208.14
7,907,175 B2* 3/2011 Osaka ........................ 348/208.7
(Continued)

FOREIGN PATENT DOCUMENTS

GB  2 400 911 A  10/2004
GB  2 421 392 A  6/2006
(Continued)

OTHER PUBLICATIONS

Ghosh et al., "Bayesian Based 3D Shape Reconstruction from Video," © 2008, 4 pages.
(Continued)

*Primary Examiner* — Twyler Haskins
*Assistant Examiner* — Dwight C Tejano (57) ABSTRACT

A video camera system includes: a video sensor providing image data; a low power imminent event detector coupled to the sensor which receives the image data from the video sensor and processes the received image data to detect changes in the image data and thereby detect an imminent event and produces an event signal on detection of an imminent event; and a main event processor also coupled to the video sensor to receive the image data, the main event processor being a higher power device than the imminent event detector, the main event detector having a dormant mode in which the main event detector consumes little or no power and a fully active powered up mode, wherein: the main event processor switches from the dormant mode to the fully active mode in response to the event signal.

27 Claims, 4 Drawing Sheets

(51) Int. Cl.
*G06K 9/32* (2006.01)
*G08B 13/196* (2006.01)

(56) References Cited

U.S. PATENT DOCUMENTS

| | | | |
|---|---|---|---|
| 8,379,095 B2* | 2/2013 | Lee et al. | 348/208.3 |
| 2001/0043270 A1* | 11/2001 | Lourie et al. | 348/155 |
| 2002/0041698 A1* | 4/2002 | Ito et al. | 382/103 |
| 2002/0071034 A1* | 6/2002 | Ito et al. | 348/152 |
| 2004/0086152 A1* | 5/2004 | Kakarala et al. | 382/103 |
| 2004/0141633 A1* | 7/2004 | Horie | 382/103 |
| 2004/0212678 A1* | 10/2004 | Cooper et al. | 348/155 |
| 2004/0252199 A1* | 12/2004 | Cheung et al. | 348/208.4 |
| 2004/0263625 A1* | 12/2004 | Ishigami et al. | 348/152 |
| 2005/0111696 A1 | 5/2005 | Baer | |
| 2005/0244033 A1* | 11/2005 | Ekin et al. | 382/103 |
| 2006/0140443 A1* | 6/2006 | Baer et al. | 382/103 |

FOREIGN PATENT DOCUMENTS

| | | |
|---|---|---|
| JP | 2002-158994 A | 5/2002 |
| WO | WO 99/45710 A1 | 9/1999 |
| WO | WO 2005/125209 A1 | 12/2005 |
| WO | WO 2008/008045 A1 | 1/2008 |

OTHER PUBLICATIONS

Nadimi et al., "Physical Models for Moving Shadow and Object Detection in Video," © 2004, 10 pages.

UK Intellectual Property Office, Combined Search and Examination Report under Sections 17 and 18(3) for GB 0807981.6, mailed Aug. 18, 2008, 7 pages.

PCT, International Search Report for PCT/GB2009/001110, mailed Aug. 14, 2009, 4 pages.

* cited by examiner

VIDEO CAMERA AND EVENT DETECTION SYSTEM

This application is a National Stage Application of PCT/GB2009/001110, filed 1 May 2009, which claims benefit of Serial No. 0807981.6, filed 1 May 2008 in United Kingdom and which applications are incorporated herein by reference. To the extent appropriate, a claim of priority is made to each of the above disclosed applications.

TECHNICAL FIELD

The present invention relates to a video camera system.

Video cameras containing an embedded processing capability are generally known. Such cameras are used to locally analyse the video data in order to generate higher level knowledge of an event, such as to automatically read a vehicle registration plate, or to record an intruder into an unauthorised area. Operational requirements often require the cameras to be situated in locations where it is difficult to connect the camera to a mains power supply or another local power source.

BACKGROUND

The present invention provides, in a first aspect, a video camera system comprising: a video sensor providing image data; a low power imminent event detector coupled to the sensor which receives the image data from the video sensor and processes the received image data to detect changes in the image data and thereby detect an imminent event and produces an event signal on detection of an imminent event; and a main event processor also coupled to the video sensor to receive the image data, the main event processor being a higher power device than the imminent event detector, the main event detector having a dormant mode in which the main event detector consumes little or no power and a fully active powered up mode, wherein: the main event processor switches from the dormant mode to the fully active mode in response to the event signal; the main event processor when fully active processes the image data from the sensor and analyses the processed image data to extract information therefrom; and the imminent event detector is arranged such that it does not produce the event signal when the changes in the image data are large, thereby indicating only that the sensor is moving.

The present invention provides, in a second aspect, a method of detecting an imminent event, comprising: receiving pixel values from the sensor for a plurality of video fields; generating a difference value by comparing the pixel values of the same location in different video fields; increasing a difference count when the difference value is above a difference threshold; comparing the difference count with a noise threshold, below which indicates noise; and comparing the difference count with a movement threshold, above which indicates sensor movement; wherein if the difference count is between the noise threshold and movement threshold the event signal is generated indicating an imminent event.

Thus, the video camera system has a low power consumption. The camera system operates at full power only intermittently. This can increase the lifetime of the illumination source. This can also reduce the heat generated within the camera system. Further, this can allow use of a solar panel to power the camera system.

DESCRIPTION OF THE DRAWINGS

The present invention will now be described, by way of example only, with reference to the Figure in which.

DETAILED DESCRIPTION

Figure 1:
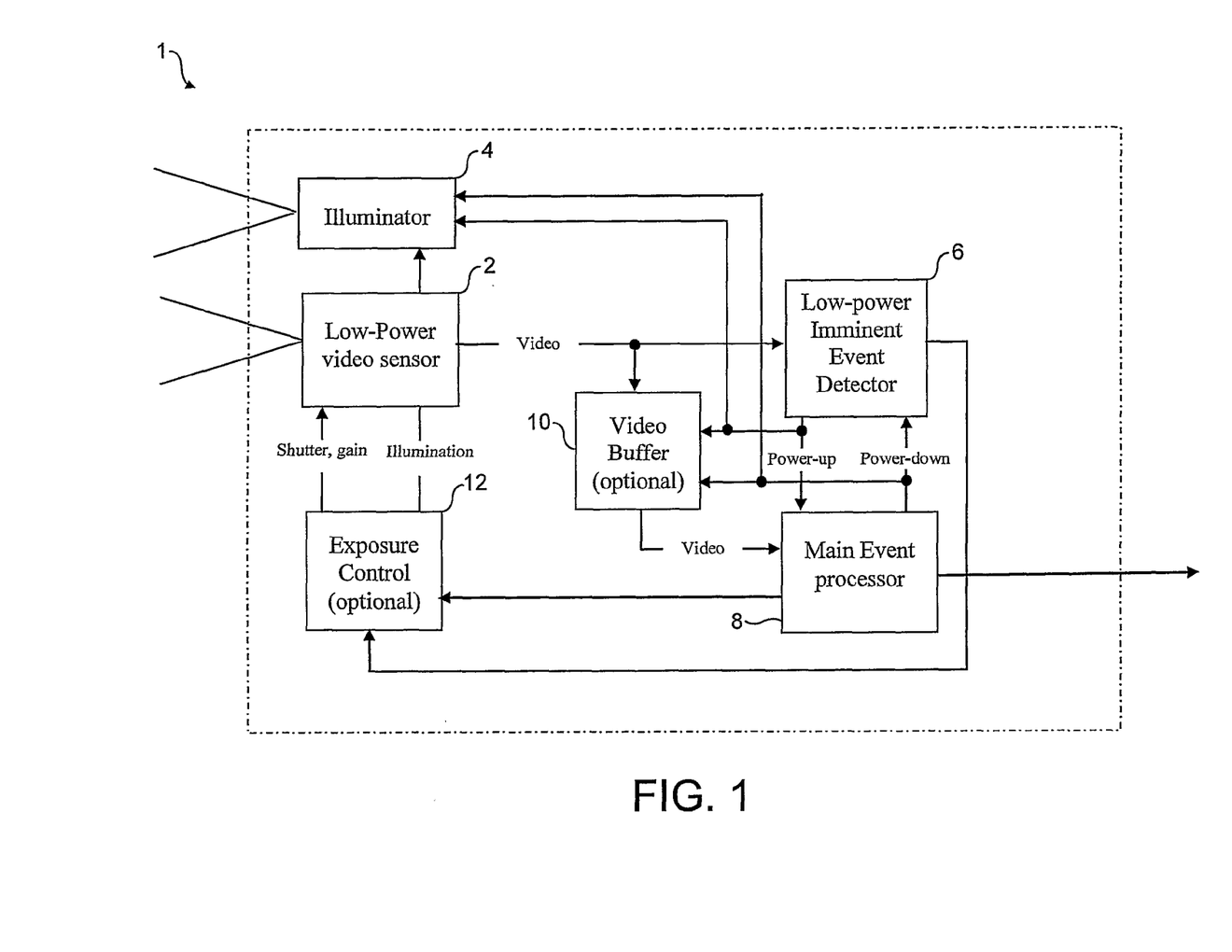
FIG. 1 is a schematic illustration of the camera system.

Referring to FIG. 1, a camera system 1 comprises a permanently powered low-power video sensor 2 to observe an event. The event may be the reading of a vehicle registration plate, an intruder in an area, or any other event which requires monitoring and processing. The sensor 2 is in a video camera providing a succession of video fields of image data. A video frame consists of two video fields taken 20 ms apart, and interlaced. The video field is treated as a still image, and processed by the camera system. The sensor 2 preferably produces a digital video signal. The sensor 2 is preferably a CMOS sensor. Alternatively, it may produce an analogue video signal which can be digitised.

An illumination source 4 providing light is located adjacent to the sensor 2. The illumination source 4 preferably comprises a plurality of light emitting diodes (LEDs). The illumination source 4 and sensor 2 preferably function at infrared wavelengths, or alternatively may function at visible wavelengths.

An imminent event detector 6 receives image data from the sensor 2. When active, the imminent event detector 6 continually analyses part or all of each video field of image data in order to detect an imminent event which is to be captured and analysed. The event detector 6 comprises low-power circuitry, for instance a low-power FPGA (Field Programmable Gate Array). The imminent event detector circuitry is permanently powered, but has a low power consumption. The event detector 6 may detect differences in one or more lines of the image data, preferably those which are "early" within a video field for a predictable event movement. For example, a vehicle entering a field of view of the camera may always enter at the top of the video field, and so the event detector 6 may detect changes at the top of the video field. Alternatively, the event detector 6 may detect a difference in any specified video line or lines.

The imminent event detector 6 produces an event signal on detection of an imminent event. The event signal triggers the illumination source 4 to be switched on. The event signal is also received by a main event processor 8. The main event processor 8 remains in a powered down mode until receiving the event signal. On receiving the event signal, the event processor 8 powers up and becomes active. Optionally, the event detector 6 may be powered down.

The main event processor 8 analyses the image data from the sensor 2. For example, this may involve carrying out an automatic number plate recognition on a vehicle registration plate. The main event processor 8 can then output the analysed data (e.g. the registration plate characters) via communication components (not shown, but e.g. an arrangement of transmitter and aerial) to a central computer, network or operator. The communication components handling the output of data may power down when not required and be activated by the event signal.

The illumination source 4 is switched off after the image data of the event has been recorded by the sensor 2. The event processor 8 and illumination source 4 may power down a predetermined time after receiving the event signal, or may power down as a final step in the event processing.

A video buffer 10 is provided between the sensor 2 and the main event processor 8. The buffer 10 temporarily stores the image data whist the main event processor 8 is powering up, or if the processor 8 is not able to analyse the image data as quickly as it is output from the sensor 2.

The sensor 2 has variable settings controlled by an exposure controller 12. The controller 12 is able to control one or more of the exposure time, aperture size or gain (i.e. sensitivity to light) of the sensor 2.

Whilst the main event processor 8 is powered down, the controller 12 optimises the camera and sensor 2 for detection of an imminent event rather than for analysis of the event. The imminent event detector 6 remains operable to detect an event whilst the illumination source is off, and so the camera is optimised for low light levels during this period. The event detector 6 may benefit from one or more of a long exposure time (i.e. long electronic shutter period), large mechanical aperture size (wide open shutter), or a high gain. Any combination of settings may be changed to increase the reliability of detecting an event occurring. In particular, a larger aperture size and/or longer shutter period will both increase the brightness of exposure, and one or both may be used.

When the imminent event processor 8 generates an event signal, then the controller 12 alters the camera and sensor settings to optimise capture of an event. The main event processor 8 analyses an event whilst the illumination source is on, and so the camera is optimised for relatively high light levels, and to provide an image with a large depth of field (i.e. event is in focus) and not blurred if moving. The settings are optimised to provide clear images to the main event processor 8, and this may include one or more of a relatively short exposure time and small aperture size, and using a low gain.

The imminent event detector 6 and the main event processor 8 are both coupled to the sensor 2. This allows a single sensor 2 to be used to both detect that an event is occurring, and to process the images of the event. The variation in camera settings optimises the sensor 2 for each of the purposes in turn. Alternatively, all or some of the same settings may be used for both purposes.

After generation of the event signal, the illumination source 4 may be switched on for a predetermined time. The illumination source 4 may produce illumination continuously for a predetermined period, for example, the illumination source 4 may be on for 3 seconds, or as little as around 100-200 ms. Alternatively, when the illumination source is on it may produce a predetermined number (e.g. three) flashes of infrared light.

The imminent event detector 6 may incorporate features which make it resilient to movement of the camera. The camera system 1 needs to be substantially static, since large movements of the camera could be interpreted as an event occurring. The camera system 1 may be mounted on a pole, which may move in the wind. The event detector 6 is resilient to producing an erroneous event signal caused by camera movement, by not producing the event signal when an overly large change between video images is detected.

The camera system 1 may be used to analyse only some of the events detected by the imminent event detector 6. Two or more camera systems 1 may be linked to a central computer, and used to calculate an average journey time of a vehicle between the sites of the camera systems. The event in this embodiment is a vehicle passing a camera system, the main event processor 8 carrying out automatic number plate recognition on part or all of vehicle registration plates. In order to accurately determine the journey time, it is desirable to time around twenty vehicles per five minutes. When a larger rate if vehicles is passing the camera system 1, the camera system 1 may not produce the event signal which triggers the main event processor into a powered-up mode at every imminent event detected; but only after one in a selected number of imminent events detected, i.e. one in four vehicles detected. The imminent event detector may include a counter to count imminent events, and produce the event signal when the count reaches the selected number, the counter then being reset.

The illumination source may not be present in the camera system 1. This embodiment would primarily function in daylight, or make use of an artificial light source independent of the camera system. The event processor 8 and illumination source have been described as powering down after the event has been processed. Alternatively, the event processor 8 may be permanently powered up, and the illumination source only powered down, but such a system would not fall within the scope of the invention as defined by the appended claims. Alternatively, the illumination source 4 may be permanently powered up and the event processor 8 only powered down after each event.

Figure 2:
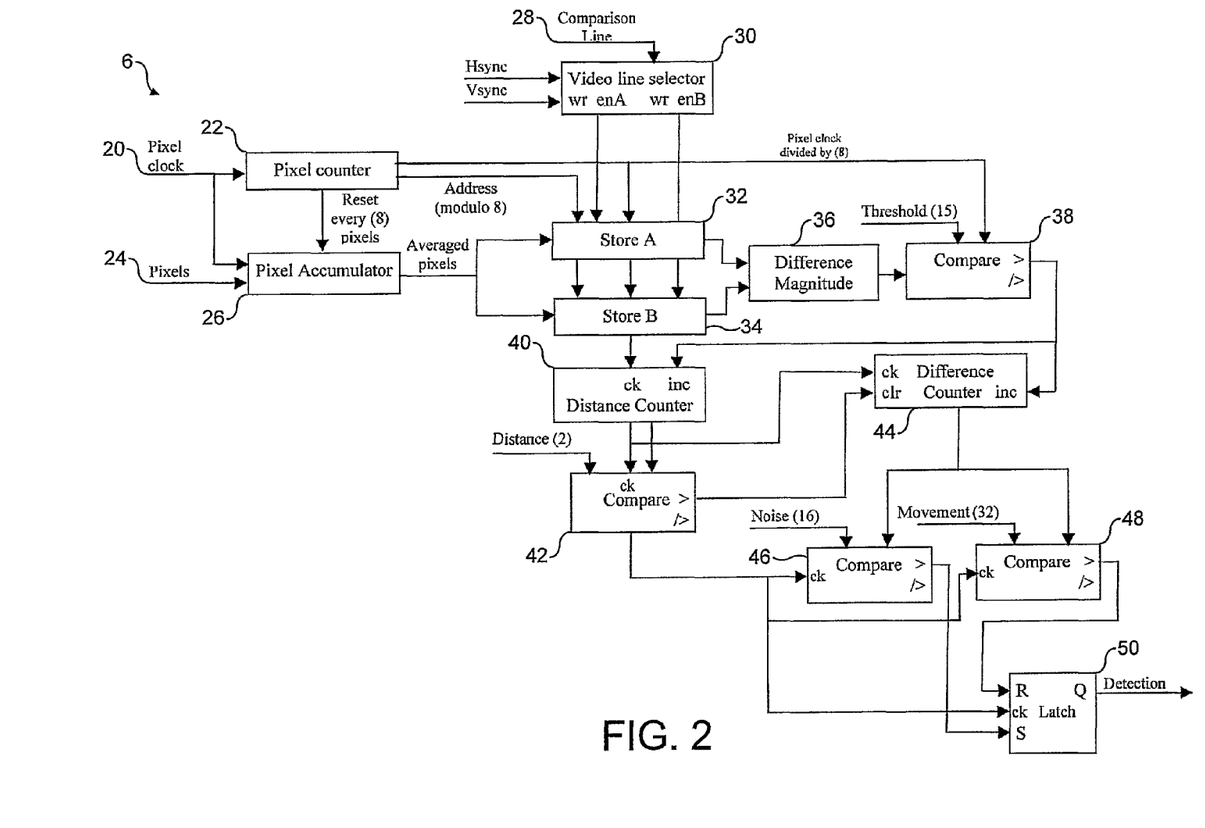
FIG. 2 schematically illustrates operation of an imminent event detector of the camera system of FIG. 1.

With reference to FIG. 2, an embodiment of the imminent event detector 6 is illustrated. The imminent event detector 6 detects changes in the video images between different video fields. The video fields analysed are preferably consecutive video fields. Alternatively video fields may be skipped such that, for example, only every other video field is analysed. A pixel clock 20 produces a signal for each pixel, which are counted by pixel counter 22. The pixel counter 22 provides a signal after a predetermined number of pixels, preferably between 4 and 20 pixels, and more preferably eight pixels.

Pixels 24 of image data from the sensor 2 are received by a pixel accumulator 26. The pixel accumulator 26 produces an average pixel value, being the average value of the pixels over a set of pixels. Each set of pixels contains a pre-determined number of pixels determined by the signal from the pixel counter 22.

A video line selector 30 receives a comparison line 28 input. The video line selector selects the particular video line which is chosen to be monitored by the imminent event detector 6. This is preferably a single video line, or alternatively may be two or more lines. When the video line selector 30 determines that the video line of interest has pixels 24 being received by the pixel accumulator 26, the video line selector 30 allows the average pixel values from the pixel accumulator 26 to be stored at either store A 32 or store B 34. The average pixel values from consecutive video fields of the video are stored alternately in store A 32 and store B 34. Alternatively, the stored video fields may not be consecutive video fields, and a pre-determined number of video fields may be skipped after a video field is stored in Store A or Store B.

Difference calculator 36 determines the magnitude difference between corresponding average pixel values in store A 32 and store B 34. The magnitude of the difference of the same pixel locations in consecutive video fields is calculated by Difference calculator 36. The magnitude is compared with a configurable threshold value in comparator 38. If the magnitude difference exceeds the threshold value (e.g. 15), then a distance counter 40 and difference counter 44 are both increment enabled.

The distance counter 40 determines the distance, measured in units of sets of pixels, between sets of pixels having an average value which exceeds the threshold (as determined by comparator 38). The distance counter 40 thus effectively measures the physical distance between significantly changed sets of pixels. The comparator 42 compares the distance with a threshold distance, preferably two sets of pixels. If the distance between significantly changed sets of pixels is greater than this threshold, then the difference counter 44 is reset.

The distance counter 40 thus provides for areas of image containing change which are not connected spatially to be rejected, and connected areas containing change to be recorded. The imminent event detector is thus sensitive to detecting a moving area, such as a vehicle or vehicle headlights.

The difference counter 44 counts how many sets of pixels exceed the magnitude threshold, as determined by comparator 38, without being reset by the distance counter 40.

If the difference count exceeds a noise threshold, as determined by comparator 46, then a detection flag is set on SR latch 50. A difference count of less than the noise threshold indicates that the difference is due to noise, and not an imminent event. The noise threshold is preferably set at 16.

If the difference count exceeds a movement threshold, as determined by comparator 48, the detection flag is reset on latch 50. The movement threshold is preferably set at 32. A difference count of more than the movement threshold indicates that the sensor 2 is itself moving, possibly due to wobble of the pole on which it is mounted, causing very large changes to the image but not indicating an imminent event.

The detection flag triggers the event signal to be generated, indicating an imminent event as described above.

Figure 3:
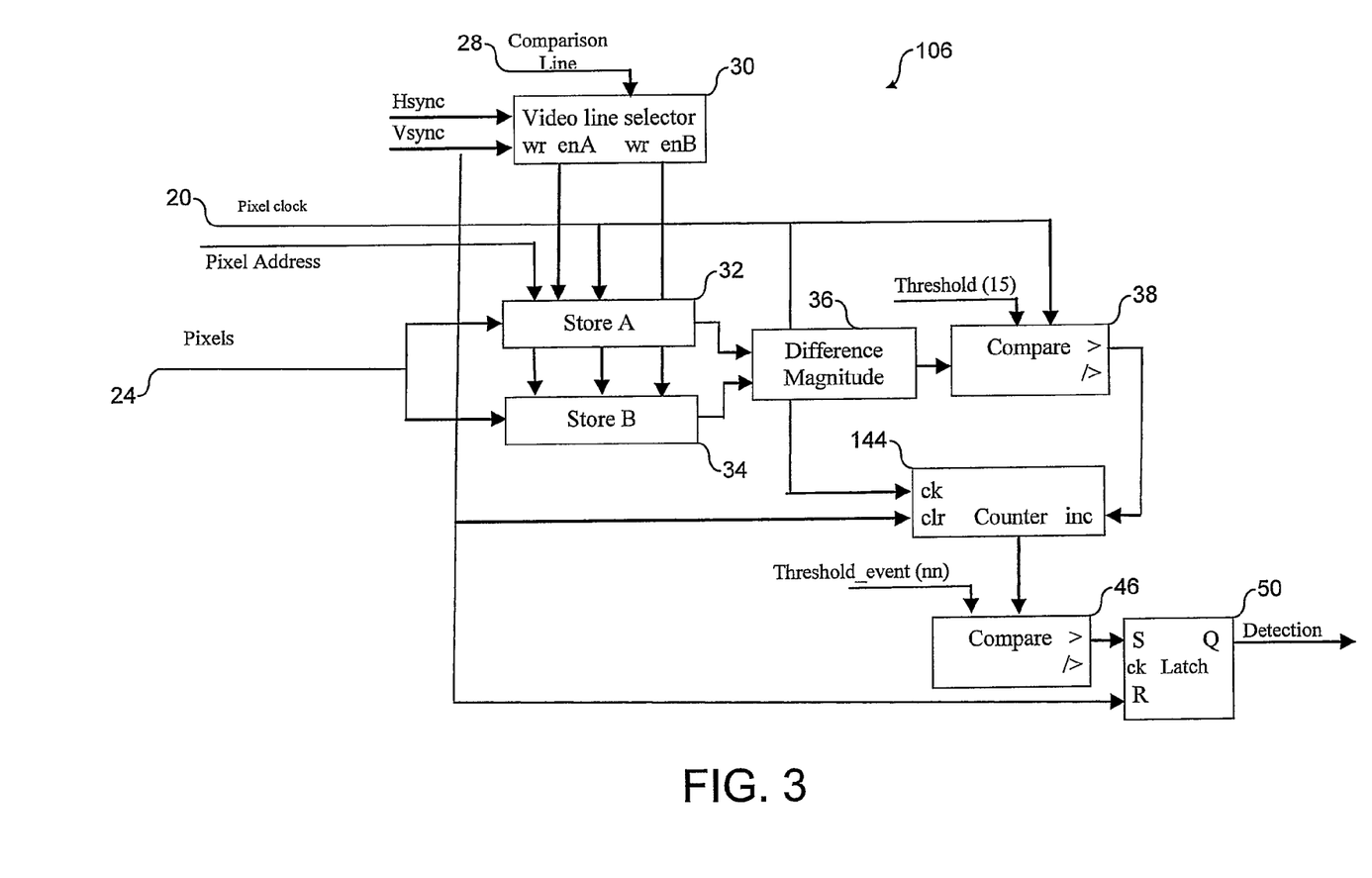
FIG. 3 schematically illustrates an alternative embodiment of the operation of an imminent event detector of the camera system of FIG. 1.
Figure 4:
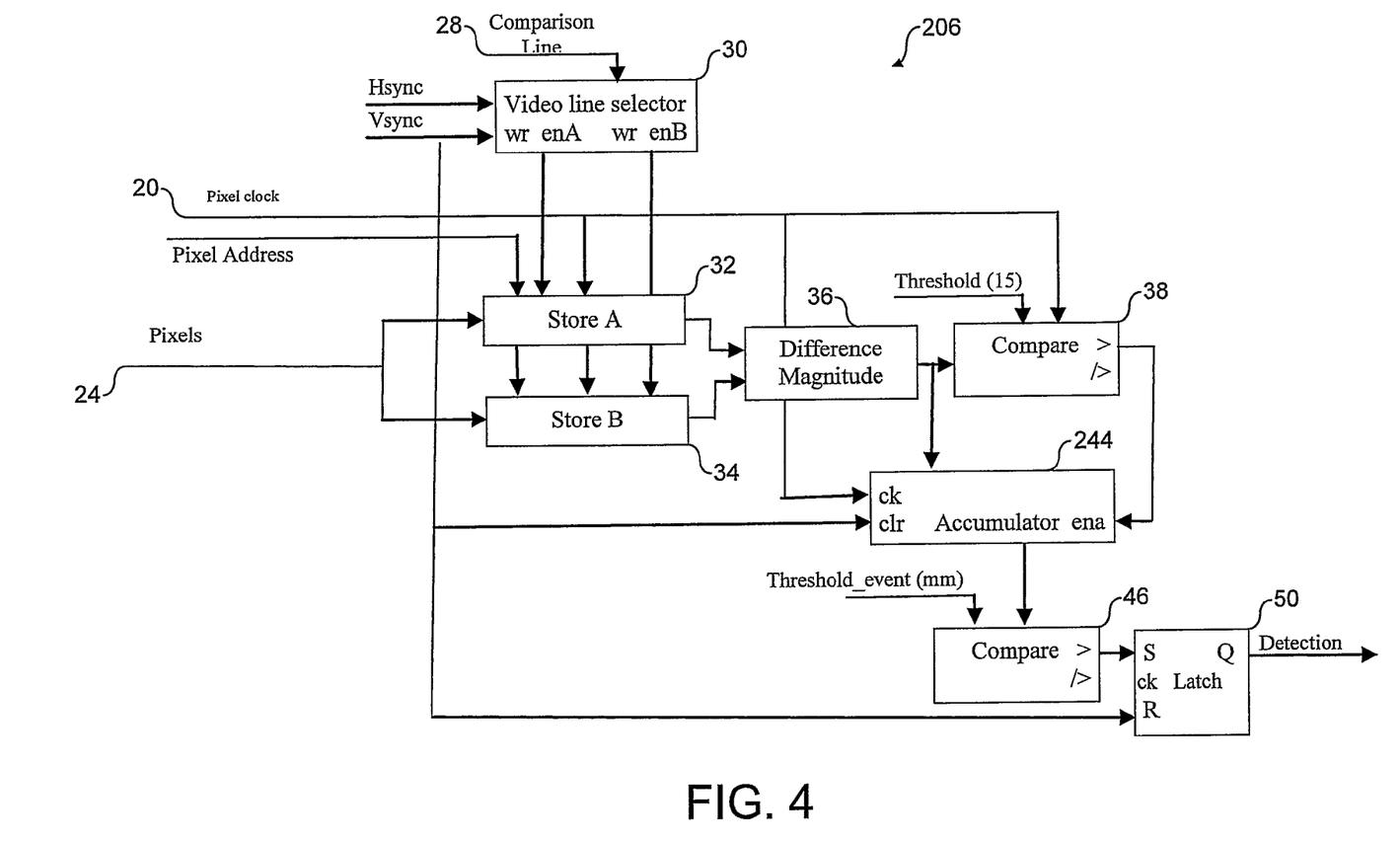
FIG. 4 schematically illustrates a further alternative embodiment of the operation of an imminent event detector of the camera system of FIG. 1.

FIGS. 3 and 4 illustrate alternative designs of the imminent event detector using fewer components. These alternative designs function in a similar manner to the embodiment of FIG. 2, and the differences will now be described.

FIG. 3 shows an example of an imminent event detector system, not falling within the scope of the appended claims, in which the pixels 24 are not averaged, and the value of each pixel of a comparison line is stored in Store A 32 or in Store B 34. The difference between corresponding pixel values is determined by Difference calculator 36. The magnitude of the difference is compared with a configurable threshold value in comparator 38, as described for FIG. 2. The counter 144 counts the number of pixels which exceed the threshold value. If the number stored on the counter 144 exceeds a threshold as determined by the comparator 46, then the latch 50 triggers the event signal to be generated. This example does not include a distance counter for the counter 144 to take into account a measure of distance, and does not include a movement threshold to avoid a false trigger of the event signal when large pixel differences indicate movement of the camera. The example of FIG. 3 thus responds to the spatial area of change, indicated by the number of changed pixels.

FIG. 4 shows an example of an imminent event detector system, not falling within the scope of the appended claims, which is substantially the same as that of FIG. 3. The main difference is that counter 144 is replaced by an accumulator 244. The accumulator 244 accumulates the magnitude value of the difference calculator 36, each time the magnitude value is greater than a threshold as determined by comparator 38. The accumulator 244 records the amount by which each changed pixel has changed. If the number stored on the accumulator 244 exceeds an appropriate threshold as determined by the comparator 46, then the latch 50 triggers the event signal to be generated. The example of FIG. 4 thus responds to the amount of difference between different video fields, rather than responding to the spatial area of change as described for the FIG. 3 embodiment.

FIG. 2 describes an example of an imminent event detector system, and different event detector systems using known comparison techniques or any combination of described features may alternatively be used in the camera system. The embodiment of FIG. 2 may have a difference counter 44 which is either a counter (such as counter 144) or an accumulator (such as accumulator 244).

The camera system 1, including image processor, is located in a housing. The camera thus has an embedded processing capability. The output from the camera system is analysed data (e.g. alphanumeric data of a vehicle registration plate), in addition to or instead of raw images.

The camera system may use a photovoltaic cell (solar panel) and battery charged by the photovoltaic cell as a power source. The lower power requirements of the illumination source makes a photovoltaic cell a feasible power source, and this avoids the need to provide a mains power supply to the location of the camera system 1.

The camera system 1 may be arranged to record the registration plate details shown on a front registration plate of a vehicle, i.e. the camera system 1 faces oncoming vehicles. Some vehicles do not have a front registration plate.

The camera system 1 may include in the same housing a separate sensor able to record images at visible wavelengths. This visible sensor preferably records colour images, and may be a video camera or a still camera. The separate sensor records an overview of the event, which is stored or sent from the camera housing without immediate analysis. Alternatively the sensor 2 itself may record an overview image which is stored or sent from the camera housing without immediate analysis.

In the event that the main event processor 8 is unable to detect a registration plate of a vehicle (i.e. cannot carry out Automatic Number Plate Recognition on an image), the main processor 8 commands the visible wavelength sensor to record a colour image of the vehicle. The image may be of the front or rear of the vehicle.

The visible wavelength sensor has a field of view which is greater than that of the infra-red sensor 2, in particular the visible wavelength sensor uses a lens which has a shorter focal length than the infra-red sensor 2. The vehicle is detected entering the field of view of the infra-red sensor 2 by the imminent event detector 6. The vehicle is therefore likely to be approximately in the centre of the larger field of view of the visible wavelength sensor.

The camera system 1 including the visible wavelength sensor provides for a colour image of a vehicle to be recorded, triggered by the imminent event detector 6, and so obviating the need for a loop trigger in the road. Preferably, the colour image is recorded only if a registration plate is not recorded, or alternatively the colour image may always be recorded, and triggered by the imminent event detector.

In use, the camera system is initially in a low-power mode with the illumination source switched off. The sensor 2 produces image data with the settings of the camera optimised to detect an imminent event. The imminent event detector 6 regularly analyses part or all of the image data to determine when an event is occurring. When an event does occur, the settings of the sensor 2 are changed to be optimised for the main event processor and the illumination source is switched on. The image data from the sensor is received by the event processor 8, possibly through a buffer, and analysed by the event processor 8. The processed data is output from the camera system. Once the event has been captured and analysed by the main event processor 8 and the captured information transmitted onward or after a predetermined time, the camera system reverts to the original low power mode.

The invention claimed is:
1. A video camera system comprising:
a video sensor providing image data;

a low power imminent event detector coupled to the sensor which receives the image data from the video sensor and processes the received image data to detect changes in the image data and thereby detect an imminent event and produces an event signal on detection of an imminent event, wherein the imminent event detector functions by:

receiving pixel values from the sensor for a plurality of video fields;

generating a difference value by averaging the pixel values of a set of pixels and comparing the average pixel values of the same location in different video fields; increasing a difference count when the difference value is above a difference threshold; and comparing the difference count with a noise threshold, below which indicates noise;

wherein the difference count is compared with a movement threshold, above which indicates sensor movement; wherein if the difference count is between the noise threshold and movement threshold the event signal is generated indicating an imminent event;

and a main event processor also coupled to the video sensor to receive the image data, the main event processor being a higher power device than the imminent event detector, the main event processor having a dormant mode in which the main event processor consumes little or no power and a fully active powered up mode, wherein:

the main event processor switches from the dormant mode to the fully active mode in response to the event signal;

the main event processor when fully active processes the image data from the sensor and analyses the processed image data to extract information therefrom; and the imminent event detector is arranged such that it does not produce the event signal when the changes in the image data are large, thereby indicating only that the sensor is moving.

2. A video camera system as claimed in claim 1, further comprising an illuminator arranged to illuminate a field of view of the video sensor, the illuminator having a dormant mode in which little or no power is consumed and an active mode in which the illuminator provides illumination, the illuminator switching from the dormant mode to the active mode in response to the event signal.

3. A video camera system as claimed in claim 1, wherein the imminent event detector analyses image data corresponding to only part of the field of view of the video sensor.

4. A video camera as claimed in claim 1, wherein the video sensor has one or more controllable settings, including at least one of exposure time, gain and aperture size, and a controller which controls the setting so that at least one of the sensor settings is different when the main event processor is active compared to when the main event processor is dormant.

5. A video camera system as claimed in claim 4, wherein the aperture size is larger, and the gain is higher or shutter period longer, when the main event processor is dormant in order to optimise operation of the video sensor for the imminent event detector.

6. A video camera system as claimed in claim 1, further comprising a buffer between the video sensor and main event processor arranged to buffer the image data until the main event processor processes the image data.

7. A video camera system as claimed in claim 2, wherein, on production of the event signal, the illuminator remains active for a predetermined time, and then automatically reverts to the dormant state thereof.

8. A video camera system as claimed in claim 2, wherein, following receipt of the event signal, the illuminator when active produces a predetermined number of flashes of illumination and then reverts to the dormant state thereof.

9. A video camera system as claimed in claim 2, wherein the sensor, the illuminator, the imminent event detector and the main event processor are all located within a camera system housing along with a transmitter which transmits over a communications network analyzed data output from the main event processor.

10. A video camera system as claimed in claim 2, wherein the video sensor operates at least partly at infrared wavelengths, and the illuminator produces illumination at least partly at infrared wavelengths.

11. A video camera system as claimed in claim 1, further comprising a photovoltaic cell and battery charged by the photovoltaic cell for powering the camera system.

12. A video camera system as claimed in claim 1, wherein, in use, the main event processor analyses the received image data by carrying out automatic number plate recognition on image data to produce vehicle registration data.

13. A video camera system as claimed in claim 1, further comprising a sensor separate from the video sensor and operable to record an image of the event at visible wavelengths, the separate sensor triggered by the main event processor or imminent event detector.

14. A video camera system as claimed in claim 1, wherein the event signal is produced only after one in a selected number of imminent events detected.

15. A video camera system as claimed in claim 1, wherein the imminent event detector functions by:

receiving pixel values from the sensor for a plurality of video fields;

generating a difference value by comparing the pixel values of the same location in different video fields;

increasing a difference count when the difference value is above a difference threshold; and comparing the difference count with a noise threshold, below which indicates noise;

wherein, if the difference count is above the noise threshold, the event signal is generated indicating an imminent event.

16. A video camera system as claimed in claim 1, wherein the difference count is reduced when the number of consecutive difference values less than the difference threshold is greater than a distance threshold.

17. A video camera system as claimed in claim 1, wherein the difference count corresponds to the number of times the difference value is above the difference threshold or the difference count corresponds to an accumulation of the magnitudes of the difference values for difference values above the difference threshold.

18. A method of detecting an imminent event, comprising:

receiving pixel values from the sensor for a plurality of video fields;

generating a difference value by generating an average pixel value by averaging the pixel values of a set of pixels and comparing the average pixel values of the same location in different video fields;

increasing a difference count when the difference value is above a difference threshold; and comparing the difference count with a noise threshold, below which indicates noise;

wherein, if the difference count is above the noise threshold, the event signal is generated indicating an imminent event.

19. A method as claimed in claim 18, further comprising reducing the difference count when the number of consecutive difference values less than the difference threshold is greater than a distance threshold.

20. A method as claimed in claim 18, wherein the difference count corresponds to the number of times the difference value is above the difference threshold or the difference count corresponds to an accumulation of the magnitudes of the difference values for difference values above the difference threshold.

21. The method as claimed in claim 18, wherein reducing the difference count when the number of consecutive difference values less than the difference threshold is greater than a distance threshold comprises resetting the difference count to zero.

22. The method as claimed in claim 18, wherein the received pixels are from a single video line.

23. A method of detecting an imminent event, comprising:
   receiving pixel values from the sensor for a plurality of video fields;
   generating a difference value by generating an average pixel value by averaging the pixel values of a set of pixels and comparing the average pixel values of the same location in different video fields;
   increasing a difference count when the difference value is above a difference threshold;
   comparing the difference count with a noise threshold, below which indicates noise; and
   comparing the difference count with a movement threshold, above which indicates sensor movement;
   wherein, if the difference count is between the noise threshold and movement threshold, the event signal is generated indicating an imminent event.

24. A method as claimed in claim 23, further comprising reducing the difference count when the number of consecutive difference values less than the difference threshold is greater than a distance threshold.

25. A method as claimed in claim 23, wherein the difference count corresponds to the number of times the difference value is above the difference threshold or the difference count corresponds to an accumulation of the magnitudes of the difference values for difference values above the difference threshold.

26. The method as claimed in claim 23, wherein reducing the difference count when the number of consecutive difference values less than the difference threshold is greater than a distance threshold comprises resetting the difference count to zero.

27. The method as claimed in claim 23, wherein the received pixels are from a single video line.

* * * * *

UNITED STATES PATENT AND TRADEMARK OFFICE
CERTIFICATE OF CORRECTION

PATENT NO.        : 8,934,013 B2                                         Page 1 of 1
APPLICATION NO.   : 12/990571
DATED             : January 13, 2015
INVENTOR(S)       : Smith It is certified that error appears in the above-identified patent and that said Letters Patent is hereby corrected as shown below:

In the claims

<u>Column 7</u>
Line 49, in claim 4, after "camera" insert -- system --.

Signed and Sealed this
Fifteenth Day of December, 2015

Michelle K. Lee
*Director of the United States Patent and Trademark Office*